US012347326B2

(12) United States Patent
Calas et al.

(10) Patent No.: US 12,347,326 B2
(45) Date of Patent: Jul. 1, 2025

(54) ELECTRONIC SYSTEM AND METHOD FOR MANAGING THE FLIGHT OF AN AIRCRAFT, WITH INSERTION OF SECTION(S) WITH CONSTRAINT(S) IN A FLIGHT PLAN, RELATED COMPUTER PROGRAM

(71) Applicant: THALES, Courbevoie (FR)

(72) Inventors: Guillaume Calas, Valence (FR); Raphael Ughetto, Valence (FR)

(73) Assignee: THALES, Courbevoie (FR)

( * ) Notice: Subject to any disclaimer, the term of this patent is extended or adjusted under 35 U.S.C. 154(b) by 272 days.

(21) Appl. No.: 17/706,254

(22) Filed: Mar. 28, 2022

(65) Prior Publication Data

US 2022/0319341 A1 Oct. 6, 2022

(30) Foreign Application Priority Data

Apr. 2, 2021 (FR) ...................................... 21 03442

(51) Int. Cl.
*G08G 5/00* (2025.01)
*G08G 5/34* (2025.01)

(52) U.S. Cl.
CPC ...................................... *G08G 5/34* (2025.01)

(58) Field of Classification Search
CPC ... G08G 5/0039; G08G 5/0052; G08G 5/0021
See application file for complete search history.

(56) References Cited

U.S. PATENT DOCUMENTS 8,234,068 B1 * 7/2012 Young .................. G08G 5/0069 701/410
10,699,582 B2 6/2020 Dacre-Wright et al.
11,320,980 B1 * 5/2022 Barber ................. G08G 5/0021
2009/0319100 A1 * 12/2009 Kale .................... G08G 5/0013 701/4
2016/0078769 A1 3/2016 Coulmeau et al.
(Continued)

FOREIGN PATENT DOCUMENTS

FR 3025920 A1 3/2016
FR 3027127 A1 4/2016
(Continued)

OTHER PUBLICATIONS

French Search Report, issued from the French Patent Office in counterpart French Application No. 2103442, dated Dec. 20, 2021.

*Primary Examiner* — Ashley L Redhead, Jr.
(74) *Attorney, Agent, or Firm* — ArentFox Schiff LLP

(57) ABSTRACT

This electronic system for managing the flight of an aircraft comprises:

- an acquisition module configured to acquire at least one flight plan section, from equipment external to the flight management system;
- an insertion module configured to insert each acquired section into a current flight plan, the current flight plan including one or more current sections, and to obtain a new flight plan resulting from said insertion; and
- a calculation module configured to calculate a new trajectory of the aircraft from the new flight plan.

At least one acquired section includes an additional constraint of a type distinct from that of the constraint(s) related to each current section, and the calculation module is configured to calculate the new trajectory as a function of each additional constraint.

13 Claims, 3 Drawing Sheets

(56) References Cited

U.S. PATENT DOCUMENTS

| | | | | |
|---|---|---|---|---|
| 2016/0103579 | A1 | 4/2016 | Coulmeau et al. | |
| 2016/0182687 | A1 | 6/2016 | Coulmeau et al. | |
| 2016/0236790 | A1* | 8/2016 | Knapp | B64C 11/44 |
| 2018/0144643 | A1* | 5/2018 | Moravek | G08G 5/0021 |
| 2020/0168104 | A1* | 5/2020 | Holder | G08G 5/0039 |
| 2022/0013018 | A1* | 1/2022 | Schwindt | G08G 5/0021 |
| 2022/0130258 | A1* | 4/2022 | Loots | G08G 5/0021 |
| 2022/0139233 | A1* | 5/2022 | Schwindt | G08G 5/0052 701/3 |
| 2022/0254257 | A1* | 8/2022 | Urbanec | G06F 3/04842 |

FOREIGN PATENT DOCUMENTS

| | | | |
|---|---|---|---|
| FR | 3030805 | A1 | 6/2016 |
| FR | 3023644 | B1 | 7/2016 |
| FR | 3067802 | A1 | 12/2018 |

* cited by examiner

ELECTRONIC SYSTEM AND METHOD FOR MANAGING THE FLIGHT OF AN AIRCRAFT, WITH INSERTION OF SECTION(S) WITH CONSTRAINT(S) IN A FLIGHT PLAN, RELATED COMPUTER PROGRAM

CROSS-REFERENCE TO RELATED APPLICATIONS

This application is a U.S. non-provisional application claiming the benefit of French Application No. 21 03442, filed on Apr. 2, 2021, which is incorporated herein by reference in its entirety.

FIELD

The present invention relates to an electronic flight management system for an aircraft, intended to be carried on board the aircraft.

The electronic flight management system comprises a module for acquiring at least one flight plan section, from an electronic transmitting equipment, external to the flight management system; a module for inserting each acquired section into a current flight plan, the current flight plan including one or more current sections, and for obtaining a new flight plan resulting from the insertion of the acquired section(s); and a module for calculating a new trajectory of the aircraft from the new flight plan.

The invention also relates to a flight management method of an aircraft, the method being implemented by such an electronic flight management system.

The invention also relates to a non-transitory computer-readable medium including a computer program including software instructions which, when executed by a computer, implement such a flight management method.

The invention relates to the field of on-board systems, and more particularly to avionics systems involving a navigation calculator, such as the flight management system, also called FMS. The invention also relates to non-avionics systems with flight management functionality, for example a non-avionics on-board tablet system, such as an EFB (Electronic Flight Bag).

BACKGROUND

The document FR 3 023 644 B1 relates to the field of aircraft flight management devices and describes an electronic system and a flight management method of the aircraft of the aforementioned type. This document recalls that a flight plan is the detailed description of the route to be followed by the aircraft in a planned flight. The flight plan is commonly managed on board civil aircraft by a flight management system, also called FMS (Flight Management System), which makes the route to be followed available to the flight personnel and to the other on-board systems. These systems allow, among other things, an aid to navigation, by displaying useful information to the pilot or by communicating flight parameters to an autopilot system.

The flight plan managed by the flight management system is coded in a specific way in the form of a series of legs, defined by an aeronautical standard, such as the international standard ARINC 424. The flight plan is then made up of an ordered series of segments, or legs, a leg corresponding to an instruction to be followed by the flight management system for the calculation of the aircraft trajectory. Each leg allows a portion of the trajectory or elementary trajectory to be generated. This elementary trajectory corresponds to a geometric element which can be a section of line, an arc or combinations of sections of line and arc, the term leg not being used in the context of the trajectory, in order not to create confusion with the term leg in the context of the flight plan.

FR 3 023 644 B1 then describes a method for inserting a flight plan section into an initial flight plan, the flight plan section including one or more legs. The inserted flight plan section then replaces a portion of the original flight plan or is added to this to form a modified flight plan. The inserted flight plan section corresponds, for example, to a takeoff or landing procedure, a tactical procedure, such as a search and rescue procedure, a low altitude flight procedure, or a procedure for avoiding a dangerous area related to the terrain or the weather. The insertion of the flight plan section into the initial flight plan corresponds to a chaining of the legs forming said section with the series of legs of the initial flight plan.

However, such a flight management system and method are not very suitable for use by the aircraft in operation, typically for carrying out particular missions, such as a search and rescue mission, a surveillance mission, a drop mission, or an approach mission on an oil platform, etc.

SUMMARY

The object of the invention is then to propose an electronic system and a method for managing the flight of an aircraft, making it possible to facilitate the use of the aircraft in operation, and typically during the aforementioned missions.

To this end, the invention concerns an electronic system for managing the flight of an aircraft, the system being intended to be carried on board the aircraft, and comprising:

- an acquisition module configured to acquire at least one flight plan section, from an electronic transmitting equipment, external to the flight management system;
- an insertion module configured to insert each acquired section into a current flight plan, the current flight plan including one or more current sections, and to obtain a new flight plan resulting from the insertion of the acquired section(s); and
- a calculation module configured to calculate a new trajectory of the aircraft from the new flight plan;
- at least one acquired section including at least one additional constraint, each additional constraint being of a type distinct from that of the constraint(s) associated with each current section, and
- the calculation module being configured to calculate the new trajectory as a function of each additional constraint.

Thus, the electronic flight management system according to the invention makes it possible to take into account one or more additional constraints for the calculation of the new trajectory following the insertion of the at least one flight plan section, each additional constraint being included in a respective acquired section.

Each additional constraint is of a type distinct from that of the constraints associated with each current flight plan section prior to insertion of the section(s). In other words, each additional constraint is a further constraint relative to any constraints already associated with the current flight plan and is furthermore of a type distinct from any such constraints already associated with the current flight plan.

In particular, each type of additional constraint is not included in the international ARINC 424 standard. In other words, each additional constraint is of a type distinct from those provided for in the international ARINC 424 standard.

Each additional constraint is also called an additional property and forms a characterization property, or a customization property, allowing the section to be better defined than with the existing constraints or properties, and in particular those provided for in the ARINC 424 standard.

The additional constraint(s) then allow more capacity to constrain or parameterize the behavior of the flight management system on the acquired flight plan sections to be offered, in order to bring an additional support to the aircraft crew, and in particular to the pilot, this in particular to limit the risks of aircraft accident.

According to other advantageous aspects of the invention, the electronic flight management system comprises one or more of the following features, taken alone or in any technically possible combination:

- each type of additional constraint is not included in the ARINC 424 standard;
- each acquired section includes one or more section legs, and each additional constraint is a section-related constraint, or a constraint related to a respective section leg;
- each constraint related to the section is of a type selected from the group consisting of:
  - a predefined duration constraint of the respective section with an undefined trajectory of the aircraft during said section;
  - a performance model constraint of the aircraft during the respective section
  - an alternative section constraint to said respective section; and
  - a predefined corridor constraint for the aircraft trajectory during the respective section;
- if the additional constraint is of the predefined duration constraint type with undefined trajectory, then the calculation module is configured to estimate a subsequent value of at least one avionics quantity as a function of said predefined duration;
- if the additional constraint is of the performance model constraint type, then the calculation module is configured to estimate a subsequent value of at least one avionics quantity as a function of the performance model defined in said constraint;
- if the additional constraint is of the alternative section constraint type, then the calculation module is configured to select the alternative section defined in said constraint in case of activation of an alternative procedure by a user, such as the pilot of the aircraft;
- if the additional constraint is of the predefined corridor constraint type, then the calculation module is configured to calculate the new trajectory within the corridor defined in said constraint, such as a lateral corridor and/or a vertical corridor;
- each constraint related to a respective section leg is of a type selected from the group consisting of:
  - a sequencing mode constraint applied to the respective leg;
  - an activating the calculation of an input transition constraint on the respective leg;
  - a maximum roll constraint applied to the calculation of an input transition on the respective leg;
  - a maximum load factor constraint applied for the calculation of an input transition on the respective leg;
  - a minimum amount of fuel remaining at an intermediate point constraint before an end point of the flight plan;
  - a wind constraint predicted during the respective leg; and
  - a vertical guidance constraint in height servo mode;
- if the additional constraint is of the sequencing mode constraint type, then the calculation module is configured to apply to said leg the sequencing mode defined in said constraint;
- if the additional constraint is of the activation of the calculation of an input transition type with the true value constraint, then the calculation module is configured to calculate the input transition on said leg
- if the additional constraints are of the activation of the calculation of an input transition type with the true value constraint, and of the maximum roll constraint type, then the calculation module is configured to calculate the input transition on said leg with the maximum roll equal to the value defined in the respective constraint;
- if the additional constraints are of the activation of the calculation of an input transition type with the true value constraint, and of the maximum load factor constraint type, then the calculation module is configured to calculate the input transition on said leg with the maximum load factor equal to the value defined in the respective constraint;
- if the additional constraint is of the minimum amount of fuel remaining constraint type, then the calculation module is configured to estimate the amount of fuel remaining at said intermediate point and generate an alert if said estimated amount is less than the minimum amount of fuel remaining defined in said constraint;
- if the additional constraint is of the predicted wind constraint type, then the calculation module is configured to estimate a subsequent value of at least one avionics quantity as a function of the predicted wind defined in said constraint;
- if the additional constraint is of the vertical guidance on the height in servo mode constraint type, then the calculation module is configured to perform vertical guidance of the aircraft in servo mode on a height relative to the ground;
- at least one acquired section includes additional information from among FAS-DB information and secure information that cannot be deciphered by the flight management system, and the system further comprises a transmission module configured to transmit the additional information to electronic receiving equipment, external to the flight management system;
- the transmission module preferably being configured to transmit the FAS-DB information to a satellite positioning system having an SBAS function; and
- each acquired section includes a respective identifier, the identifier being distinct from one section to another.

The invention also relates to a method for managing the flight of an aircraft, the method being implemented by an electronic flight management system to be carried on board the aircraft, and comprising the following steps:

- acquiring at least one flight plan section, from an electronic transmitting equipment, external to the flight management system;
- inserting each acquired section into a current flight plan, the current flight plan including one or more current sections, and to obtain a new flight plan resulting from the insertion of the acquired section(s); and calculating a new trajectory of the aircraft from the new flight plan;

at least one acquired section including at least one additional constraint, each additional constraint being of a type distinct from that of the constraint(s) associated with each current section, and during the calculation step, the new trajectory is calculated as a function of each additional constraint.

The invention also concerns a non-transitory computer-readable medium including a computer program including software instructions which, when executed by a computer, implement a flight management method, as defined above.

BRIEF DESCRIPTION OF THE DRAWINGS

These features and advantages of the invention will become clearer upon reading the following description, given only as a non-limiting example, and made with reference to the appended drawings, on which.

DETAILED DESCRIPTION

Figure 1:
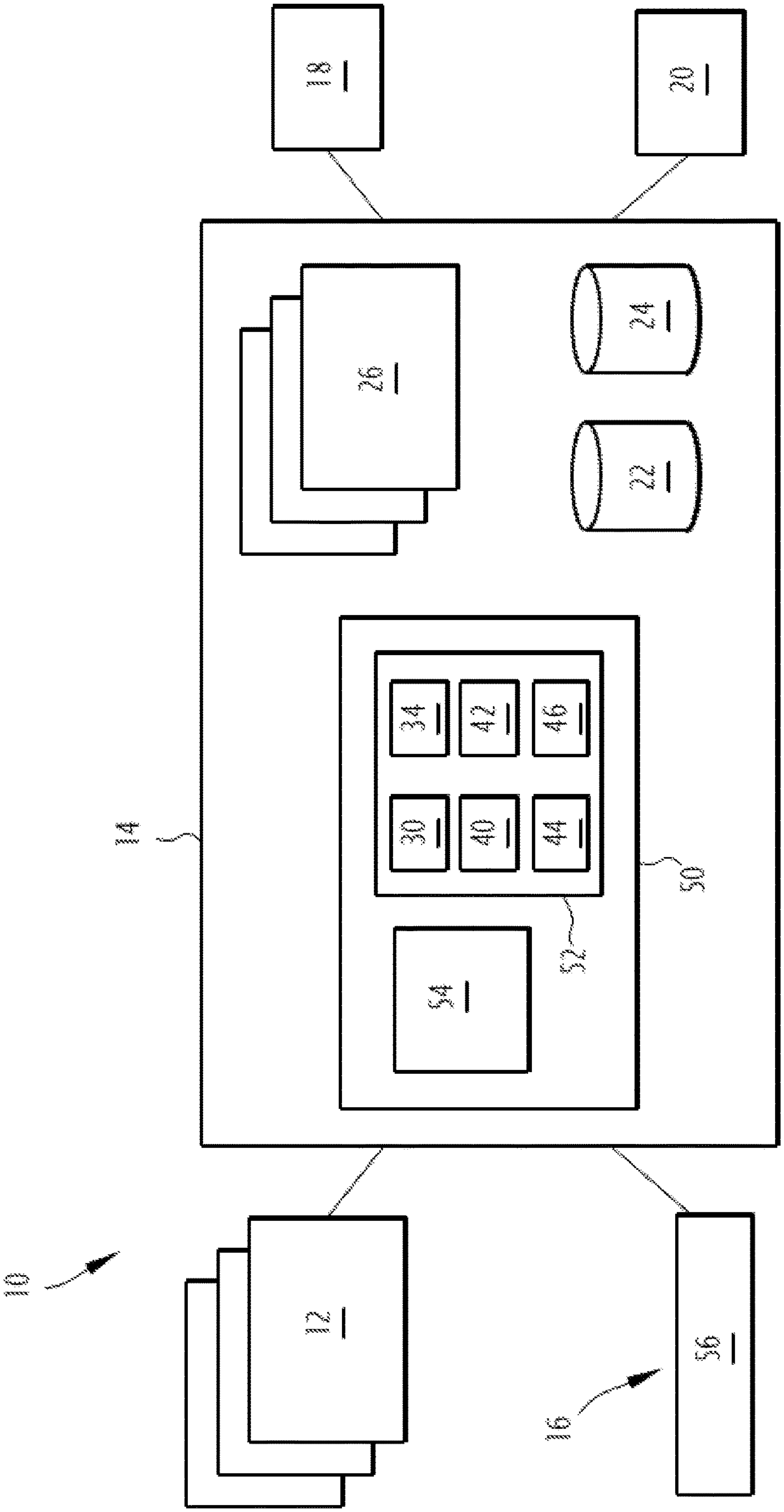
FIG. 1 is a schematic representation of an aircraft including avionics systems, of which a flight management system according to the invention, the flight management system including a module for acquiring at least one flight plan section, a module for inserting each acquired section into a current flight plan in order to obtain a new flight plan, and a module for calculating a new trajectory for the aircraft from the new flight plan.

In FIG. 1, an aircraft 10 comprises a plurality of avionics systems 12, an electronic flight management system 14, also known as an FMS, and a user interface 16 connected to the flight management system 14.

Also shown in FIG. 1 is an electronic transmitting equipment 18, external to the flight management system 14, yet able to communicate with the flight management system 14. In the example shown in FIG. 1, the electronic transmitting equipment 18 is included in the aircraft 10 and is connected to the flight management system 14.

Alternatively, the transmitting equipment 18 and the flight management system 14 are implemented as a single avionics calculator, carried on board the aircraft 10; the transmitting equipment 18 and the flight management system 14 then being implemented as separate software functions within said avionics calculator.

Alternatively, the electronic transmitting equipment 18 is external to the aircraft 10 and is typically ground-based equipment.

Also shown in FIG. 1 is an electronic receiving equipment 20, external to the flight management system 14, yet capable of communicating with it, particularly to receive information from the flight management system 14. In the example shown in FIG. 1, the receiving equipment 20 is included in the aircraft 10 and is then connected to the flight management system 14.

Alternatively, the receiving equipment 20 and the flight management system 14 are implemented as a single avionics calculator, carried on board the aircraft 10; the receiving equipment 20 and the flight management system 14 then being implemented as separate software functions within said avionics calculator.

In addition to this variant, the transmitting equipment 18, the receiving equipment 20 and the flight management system 14 are implemented in the form of a single avionics calculator, on board the aircraft 10; the transmitting equipment 18, the receiving equipment 20 and the flight management system 14 then being implemented in the form of separate software functions within said avionics calculator.

In yet another variant, the receiving equipment 20 is an equipment external to the aircraft 10, and for example a ground equipment.

Figure 2:
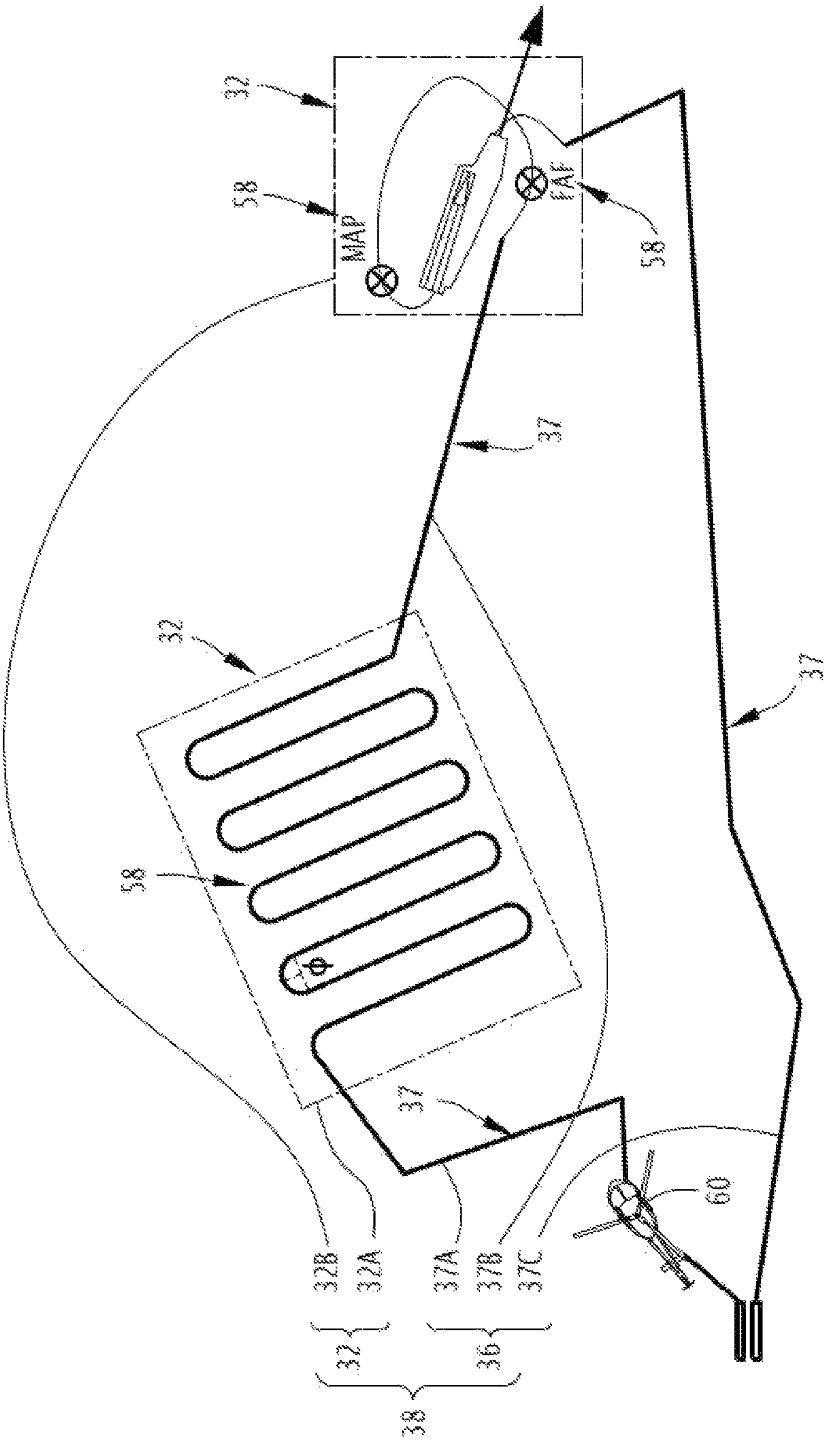
FIG. 2 is a schematic representation of the insertion, by the flight management system of FIG. 1, of flight plan section(s) into the current flight plan, two flight plan sections being inserted in the example of this figure.

The aircraft 10 is, for example, an airplane. Alternatively, the aircraft 10 is a helicopter, as shown in the example of FIG. 2, or a drone that can be flown remotely by a pilot.

The avionics systems 12 are known per se and are capable of transmitting to the flight management system 14 and/or receiving from the flight management system 14, various avionics data, for example so-called "aircraft" data, such as the position, orientation, heading or even altitude of the aircraft 10, and/or so-called "navigation" data, such as a flight plan.

The flight management system 14 comprises, as known per se, a navigation database 22, a performance database 24, and one or more flight management functions 26.

The flight management system 14 is an electronic system embodying flight management functionality, in particular via the implementation of the one or more flight management functions 26. The flight management system 14 is, for example, a certified avionics system. Alternatively, the flight management system 14 is a non-avionics onboard tablet system, such as an EFB.

According to the invention, the flight management system 14 further comprises an acquisition module 30 for acquiring at least one flight plan section 32; an insertion module 34 for inserting each acquired section 32 into a current flight plan 36, the current flight plan 36 including one or more current sections 37, to obtain a new flight plan 38; and a calculation module 40 for calculating a new trajectory of the aircraft 10 from the new flight plan 38.

As an optional addition, the flight management system 14 comprises a display module 42 for displaying information and/or a sending module 44 for sending a trajectory, in particular the new trajectory, to a corresponding avionics system 12, such as an autopilot system.

As a further optional addition, the flight management system 14 comprises a transmission module 46 for transmitting at least one piece of information to the corresponding electronic receiving equipment 20.

In the example of FIG. 1, the electronic flight management system 14 comprises an information processing unit 50 formed by, for example, a memory 52 and a processor 54 related to the memory 52.

In the example of FIG. 1, the acquisition module 30, the insertion module 34 and the calculation module 40, as well as optionally the display module 42, the sending module 44 and the transmission module 46, are each implemented as software, or a software brick, executable by the processor 54. The memory 52 of the flight management system 14 is then capable of storing software for acquiring at least one flight plan section 32, software for inserting each acquired section 32 into the current flight plan 36 to obtain the new flight plan 38, and software for calculating the new trajectory of the aircraft 10 from the new flight plan 38. As an optional addition, the memory 52 of the flight management system 14 is able to store software for displaying information, software for sending trajectory(s) to a corresponding avionics system 12; and software for transmitting information to the corresponding receiving equipment 20. The processor 54 is then capable of executing each of the software from the acquisition software, the insertion software, and the calculation software, as well as optionally the display software, the sending software, and the transmission software.

Alternatively, and not shown, the acquisition module 30, the insertion module 34, and the calculation module 40, and optionally the display module 42, the sending module 44, and the transmission module 46, are each implemented as a programmable logic component, such as an FPGA (Field Programmable Gate Array), or as an integrated circuit, such as an ASIC (Application Specific integrated Circuit).

When the flight management system 14 is implemented as one or more software programs, i.e., as a computer program, also referred to as a computer program product, it is further able to be recorded on a computer-readable medium, not shown. The computer-readable medium is, for example, a medium capable of storing electronic instructions and of being coupled to a bus of a computer system. For example, the readable medium is an optical disk, a magneto-optical disk, a ROM memory, a RAM memory, any type of non-volatile memory (e.g., EPROM, EEPROM, FLASH, NVRAM), a magnetic card or an optical card. On the readable medium is then stored a computer program comprising software instructions.

The user interface 16 is known per se. The user interface 16 includes, for example, a display screen 56, such as a touch screen, to allow input of interaction(s) from a user, not shown, such as the pilot or co-pilot of the aircraft 10. The display screen 56 allows the display of information, such as at least one trajectory calculated and then generated by the calculation module 40.

The electronic transmitting equipment 18 is, for example, a non-avionics onboard tablet system implementing flight management or optimization functions, such as an EFB. Alternatively, the electronic transmitting equipment 18 is a mission planning system.

The electronic transmitting equipment 18 can then manage user-specific operations, such as the pilot of the aircraft 10, these user-specific operations being, for example, operations outside the terminal areas of civil airports or flight areas dedicated to air transport.

The navigation database 22, also referred to as the NAVDB (NAVigation Date Base) is typically a database containing aeronautical data, such as common aeronautical data regularly provided by an aeronautical database provider and/or user aeronautical data containing, for example, items entered by the user and/or by a company chartering the aircraft 10. The aeronautical data contained in the navigation database 22 is then used to construct geographic routes and/or procedures.

The performance database 24, also referred to as the PERFDB (PERFormance Data Base) contains aircraft performance models, such as speed, fuel consumption, ceiling limit, climb time, climb distance, etc., based on aerodynamic and engine parameters of the aircraft 10.

The flight management functions 26 are known per se, and include, for example, a navigation function to perform optimal localization of the aircraft 10 based on geolocation means, such as satellite geo-positioning means, VHF radio navigation beacons, or even inertial units. The flight management functions 26 typically also include a flight plan function to capture geographic elements constituting a skeleton of the route to be followed, such as points imposed by departure and arrival procedures, waypoints, air corridors. The flight management functions 26 also include a lateral trajectory function to build a continuous trajectory from the flight plan points and respecting the performance of the aircraft 10, as well as containment constraints, also called RNP (Required Navigation Performance); a prediction function for building an optimized vertical profile on the lateral and vertical trajectory and giving estimates of distance, time, altitude, speed, fuel and wind in particular on each point, at each change of piloting parameter and at destination, these estimates being intended to be displayed on the display screen 56. The flight management functions 26 also include, for example, a guidance function to guide the aircraft 10 in lateral and vertical planes on its three-dimensional trajectory, while optimizing its speed, using the information calculated by the prediction function.

The flight management functions 26 are preferably each implemented as a software program, or software brick, stored in the memory 52 of the information processing unit 50, and executable by the processor 54. Alternatively, the flight management functions 26 are preferably implemented in the form of a programmable logic component, such as an FPGA, or in the form of an integrated circuit, such as an ASIC.

The acquisition module 30 is configured to acquire at least one flight plan section 32 from the electronic transmitting equipment 18, at least one acquired section 32 including at least one additional constraint.

Each additional constraint is of a type distinct from the type of constraint(s) related to each current section 37. In particular, each additional constraint is of a type that is not included in ARINC 424 standard, particularly in its latest version, namely version 22 published on Jul. 23, 2018.

Each acquired section 32 includes a respective identifier, the identifier being distinct from one section 32 to another. The identifier for each acquired section 32 is unique within the new flight plan 38. The identifier of each acquired section 32 then allows the flight management system 14 to manage multiple distinct acquired sections 32 within the new flight plan 38.

Each acquired section 32 includes one or more legs 58 of the section. Each additional constraint included in a respective acquired section 32 is then either a constraint associated with the respective section 32, or a constraint associated with a respective leg 58 of said section 32. The constraint associated with the section 32 is a constraint associated with the section 32 as a whole, that is, as a whole. Each additional constraint is then selected from a constraint associated with the respective section 32 and a constraint associated with a respective leg 58 of the respective section.

Each constraint associated with the respective section 32 is of a type selected from the group consisting of:

- a predefined duration constraint of the respective section 32 with an undefined trajectory of the aircraft 10 during said section 32;
- a performance model constraint of the aircraft 10 during the respective section 32;
- an alternative section constraint to said respective section 32; and
- a predefined corridor constraint for the trajectory of the aircraft 10 during the respective section 32.

Each constraint associated with a respective section leg 58 is of a type selected from the group consisting of:

- a sequencing mode constraint applied to the respective leg 58;
- an enabling the calculation of an input transition constraint on the respective leg 58;

a maximum roll constraint applied to the calculation of an input transition on the respective leg 58;

a maximum load factor constraint applied for calculating an input transition on the respective leg 58;

a minimum fuel quantity constraint applied for calculating an input transition on the respective leg 58;

a constraint on the minimum amount of fuel remaining at an intermediate point before an end point of the flight plan, in particular of the new flight plan 38;

a constraint on the predicted wind at the respective leg 58; and a vertical guidance constraint in height servo mode.

As an optional addition, at least one acquired section 32 includes at least one additional piece of information among a Final Approach Segment Data Block (FAS-DB) information and a secured information that cannot be deciphered by the flight management system 14.

The FAS-DB information is known per se and characterizes a leg around which the aircraft 10 must be guided, particularly during the approach phase. The FAS-DB information is then intended to be transmitted to a satellite positioning system, Satellite Based Augmentation System (SBAS), such as a Global Positioning System (GPS). To perform this guidance with increased accuracy, the satellite positioning system must be in SBAS mode.

The secure, undecipherable information is contained in a data field, also called an opaque field, which allows for the transport of proprietary information. This data field is associated with the respective section 32 as a whole or to a respective leg 58 of the acquired section. The secure information contained in this opaque field is not modified by the flight management system 14 and is only transmitted back to the receiving equipment 20. This secure information is also indecipherable, i.e., not decodable, by the flight management system 14.

The insertion module 34 is configured to insert each acquired section 32 into the current flight plan 36, and to then obtain the new flight plan 38 resulting from the insertion of the acquired section(s) 32.

The insertion module 34 is then typically configured to insert each acquired section 32 in addition to the current sections 37 of the current flight plan, or alternatively to replace a portion of the current flight plan 36, typically replacing one or more current sections 37.

For example, the insertion module 34 is configured to insert each acquired section 32 in a manner similar to that described in FR 3 023 644 B1, i.e., according to the insertion method described therein.

In the example of FIG. 2, the current flight plan 36 comprises four current sections 37, namely a first current section 37A, a second current section 37B, a third current section 37C, as well as a fourth current section, not shown, and replaced by a first acquired section 32A. In this example of FIG. 2, two sections have been acquired by the acquisition module 30, namely the first acquired section 32A and a second acquired section 32B. The first acquired section 32A includes several section legs 58 with alternating straight and curved legs, and the second acquired section 32B includes several section legs 58, including a leg associated with a Final Approach Fix, also called FAF, and another leg associated with a Missed Approach Point, also called MAP, the second acquired section 32B corresponding, in the example of FIG. 2, to an intermediate landing, for example on a ship.

In this example of FIG. 2, the aircraft 10 is a helicopter, as illustrated by the helicopter-shaped aircraft symbol 60.

The new flight plan 38 then results from the insertion of the acquired sections 32 into the current flight plan 36, and is, in this example of FIG. 2 formed by the first current section 37A, followed by the first acquired section 32A, followed by the second current section 37B, followed by the second acquired section 32B and finally followed by the third current section 37C. In this example in FIG. 2, the first acquired section 32 has been inserted as a replacement for a current section, not shown, and the second section 32B has been added relative to the current sections 37 of the current flight plan 36.

The calculation module 40 is configured to calculate the new trajectory based on the new flight plan 38 and further based on each additional constraint included in a respective acquired section 32.

The calculation module 40 is connected to the flight management functions 26 and is configured to implement the functionalities of the flight management functions 26 described above, in particular for trajectory calculation, or for estimating subsequent avionics quantity values.

Among the additional constraints associated with the respective section 32, if the additional constraint is of the predefined duration constraint type with undefined trajectory, then the calculation module 40 is configured to estimate a subsequent value of at least one avionics quantity as a function of said predefined duration. This additional constraint then corresponds to the case where the trajectory of the aircraft 10 is not known in advance and where the acquired section 32 is inserted between two points of the flight plan, namely a first point and a second point, and with the possibility of having a trajectory discontinuity between the actual end of the section and said second point.

The calculation module 40 then uses the predefined duration included in this additional constraint to predict the subsequent value of at least one avionics quantity over the remainder of the flight plan. The acquired section 32 associated with such an additional constraint is, for example, a Search And Rescue (SAR) type section, for which the search trajectory is not known in advance, but for which the duration is known in advance. The avionics quantity for which a subsequent value is thus estimated as a function of the predefined duration is typically a quantity of fuel remaining at a given point, such as a quantity of fuel remaining at destination, i.e., at a final point of the new flight plan 38.

If the additional constraint is of the performance model constraint type, then the calculation module 40 is configured to estimate a subsequent value of at least one respective avionics quantity based on the performance model defined in said constraint.

The performance model then typically includes one or more polynomials modeling different parameters of the aircraft 10, such as climb time, different speeds of the aircraft 10, fuel consumption, etc. . . . . The calculation module 40 is then configured to use this performance model contained in the additional constraint included in the respective acquired section 32, instead of polynomials from the performance database 24, and only on the portion of trajectory corresponding to the acquired section 32 associated with said additional constraint.

The one or more polynomials included in the performance model contained in the additional constraint are typically two-parameter polynomials, for example denoted X and Y. Each polynomial in the performance model then verifies, for example, one of the following equations:

$$Pnm = \sum_{i=0}^{n}\sum_{j=0}^{m} a_{ij} \cdot X^i \cdot Y^j \quad \text{[Math 1]}$$

where X and Y represent the parameters, $a_{ij}$ represents a predefined real coefficient, and n and m are positive integers with n+m≤5

$$PSn = \sum_{i=0}^{n}\sum_{j=0}^{n-1} a_{ij} \cdot X^i \cdot Y^j \quad \text{[Math 2]}$$

where X and Y represent the parameters, $a_{ij}$ represents a predefined real coefficient, and n is a positive integer, with n≤5.

The polynomial(s) of the performance model allow, in particular, a speed calculation; a fuel consumption calculation; a ceiling limit calculation; a climb time calculation, also called TTC (Time To Climb); a climb distance calculation, also called DTC (Distance To Climb); a calculation of the fuel consumed during the climb, also noted FTC (Fuel to Climb); a calculation of the fuel consumption during the descent, also noted FTD (Fuel to Descent); or a calculation of the vertical speed for a rate of descent in cruise.

The skilled person will then observe that the calculation module 40 makes it possible to change the polynomial(s) used for the calculation of the prediction of the avionics quantity by using the performance model received via said additional constraint and including one or more modeling polynomials, this instead of the default set of polynomials, i.e., the set of polynomials contained in the performance data base 24. The state-of-the-art flight management system, and in particular its prediction function, only takes into account the predefined set of polynomials contained in the associated performance database for the entire flight plan.

If the additional constraint is of the alternative section constraint type, then the calculation module 40 is configured to select the alternative section defined in said constraint in case of activation of an alternative procedure by a user, such as the pilot of the aircraft 10. The alternative procedure is, for example, an alternative landing approach procedure, and this additional constraint then allows an alternative section to be used, rather than the section received initially.

If the additional constraint is of the predefined corridor constraint type, then the calculation module 40 is configured to calculate the new trajectory within the corridor defined in said constraint, i.e., to adapt the new trajectory so that it remains permanently within said corridor. The corridor is for example a lateral corridor or a vertical corridor. In addition, the additional constraint includes two corridors, namely the lateral corridor and the vertical corridor. The lateral corridor is also referred to as the lateral corridor; and the vertical corridor is also referred to as the vertical corridor.

The skilled person will understand that when the additional constraint is of the lateral corridor constraint type, then the calculation module 40 is configured to calculate the new lateral trajectory within this lateral corridor. Additionally, or alternatively, when the additional constraint is of the vertical corridor constraint type, then the calculation module 40 is configured to calculate the new vertical trajectory within said vertical corridor.

Optionally, as a complement, if the aircraft 10 leaves the predefined corridor, and its position is then outside said corridor, then the calculation module 40 is further configured to generate an alert.

Among the additional constraints associated with the respective leg 58, if the additional constraint is of the sequencing mode constraint type, then the calculation module 40 is configured to apply the sequencing mode defined in said constraint to said leg 58.

This additional constraint then allows the flight management system 14 to impose the sequencing mode, i.e., the sequencing type, to be applied to the respective leg 58. Furthermore, this additional constraint allows for a choice from a plurality of possible sequencing modes.

The sequencing mode to be applied to the respective leg 58 is, for example, selected from the plurality of possible sequencing modes consisting of: sequencing by distance; sequencing by passing through a given geometric plane; sequencing by flying over a given point; and manual sequencing.

If the additional constraint is of the activate the calculation of an input transition constraint type, and this additional constraint contains the true value, such as the Boolean value 1 or the TRUE value, then the calculation module 40 is configured to calculate the input transition on said respective leg 58. The calculation of the input transition is known per se.

This additional constraint then forms an indicator for the flight management system 14 as to whether it should perform the calculation of this input transition, or whether it is performed by other avionics equipment.

The skilled person will further understand that setting this constraint for activating the calculation of an input transition to a false value, such as the Boolean value 0 or even the value FALSE, corollary allows the calculation of the input transition to be deactivated by the flight management system 14.

If the additional constraints are of the enable calculation of an input transition type with the true value constraint, and of the maximum roll constraint type, then the calculation module 40 is configured to calculate the input transition on said leg 58 with the maximum roll equal to the value defined in the respective constraint.

The maximum roll constraint then allows a default value of the maximum roll allowed for the aircraft 10 to be changed, and this only on the respective leg 58.

If the additional constraints are of the activate the calculation of an input transition type with the true value constraint, and of the maximum load factor constraint type, then the calculation module 40 is configured to calculate the input transition on said leg 58 with the maximum load factor equal to the value defined in the respective constraint. Specifically, the maximum load factor is then taken into account to calculate a new maximum roll value on the respective leg 58, and the calculation module 40 is then configured to calculate the input transition on said leg 58 with the maximum roll equal to this new maximum roll value, as previously described.

If the additional constraint is of the minimum amount of fuel remaining constraint type, then the calculation module 40 is configured to estimate the amount of fuel remaining at said intermediate point, for example at any point of the respective leg 58 and generate an alert if said estimated amount is less than the minimum amount of fuel remaining value, defined in said constraint.

If the additional constraint is of the predicted wind constraint type, then the calculation module 40 is configured to estimate a subsequent value of at least one avionics quantity based further on the predicted wind value defined in said constraint.

If the additional constraint is of the vertical guidance in height servo mode constraint type, then the calculation module 40 is configured to perform vertical guidance of the aircraft 10 in height servo mode relative to the ground.

This additional constraint then forces the flight management system 14 to switch the vertical guidance of the aircraft

10 to a height relative to the ground slave mode, rather than on altitude slave mode of the aircraft 10.

As an optional addition, the display module 40 is configured to display information generated by the flight management system 14 on the display screen 56, and in particular configured to display the new flight plan 38 and/or the new trajectory of the aircraft 10 on the display screen 56.

As a further optional addition or alternative, the sending module 44 is configured to send the new trajectory, calculated by the calculation module 40, to a corresponding avionics system 12, and for example to an autopilot system.

As a further optional addition, the transmission module 46 is configured to transmit the additional information described above, namely the FAS-DB information or the secure, undecipherable information, to the corresponding electronic receiving equipment 20.

The transmission module 46 is typically configured to transmit the FAS-DB information to the satellite positioning system having an SBAS function. In other words, when the additional information is the FAS-DB information, then the corresponding electronic receiving equipment 20 is typically a respective satellite positioning system having an SBAS function.

Alternatively, when the additional information is secure indecipherable information, then the corresponding electronic receiving equipment 20 is typically an electronic equipment other than a satellite positioning system.

Figure 3:
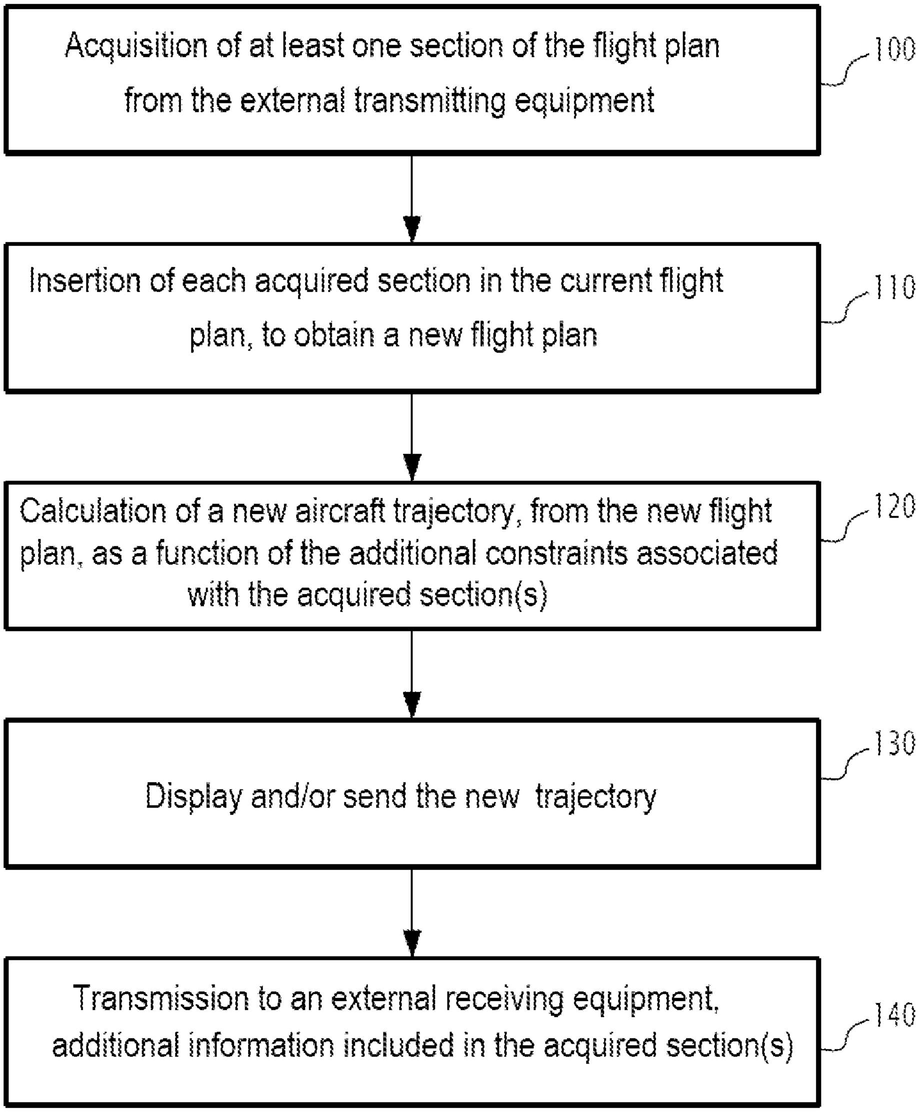
FIG. 3 is a flow chart of a method, according to the invention, for managing the flight of the aircraft, the method being implemented by the electronic flight management system of FIG. 1.

The operation of the flight management system 14 according to the invention will now be described with reference to FIG. 3 showing a flow chart of the method, according to the invention, for managing the flight of the aircraft 10.

In an initial step 100, the flight management system 14 acquires, via its acquisition module 30, at least one respective flight plan section 32, this from the transmitting equipment 18, external to the flight management system 14.

According to the invention, at least one acquired section 32 includes at least one additional constraint, and each additional constraint is of a type distinct from that of constraint(s) associated with each current section 37. In particular, each additional constraint is of a type that is not included in the ARINC 424 standard. Each additional constraint is of one of the types described above.

The flight management system 14 then proceeds to the next step 110 in which it inserts, via its insertion module 34, each acquired section 32 into the current flight plan 36, to then obtain the new flight plan 38 resulting from the insertion of the acquired section(s) 32.

The insertion module 34 inserts each acquired section 32 in addition to the current sections 37 of the current flight plan, or else by replacing a part of the current flight plan 36, typically by replacing one or more current sections 37.

The insertion module 34 inserts, for example, each acquired section 32 in a manner similar to that described in FR 3 023 644 B1, i.e., according to the insertion method described in that document.

At the end of the insertion step 110, the flight management system 14 calculates, in the next step 120 and via its calculation module 40, the new trajectory of the aircraft 10 based on the new flight plan 38 and as a function of additional constraint(s) associated with the acquired section(s) 32.

This calculation of the new trajectory of the aircraft 10, and in particular this taking into account of the additional constraint(s) associated with the acquired section(s) 32, is performed as previously described, and in particular according to the type of each additional constraint.

In a subsequent optional step 130, the flight management system 14 displays, via its display module 42 and on the display screen 56, information generated by the flight management system 14, and in particular the new flight plan 38 and/or the new trajectory of the aircraft 10.

Alternatively, or additionally during the optional step 130, the flight management system 14 sends, via its sending module 44, the new trajectory, calculated during the calculation step 120, to a corresponding avionics system 12, and for example to the autopilot system.

In an optional step 140, following step 130 or in parallel thereto, the flight management system 14 transmits, via its transmission module 46, the additional information from among the FAS-DB information and the secure, undecipherable information, to a respective electronic receiving equipment 20.

The transmission module 46 typically transmits the FAS-DB information to the satellite positioning system having an SBAS function, and the secure, undecipherable information to an electronic equipment other than the satellite positioning system. Preferably, the transmission module 46 transmits the FAS-DB information to said satellite positioning system in an individual and separate manner, particularly that relative to the new flight plan 38. Even more preferably, the transmission module 46 transmits the secure, undecipherable information with the new flight plan 38, to the other electronic equipment. In other words, the secure, undecipherable information is, according to this preference, not dissociated from the new flight plan 38.

Thus, the electronic flight management system 14 according to the invention allows additional constraint(s) to be taken into account for the calculation of the new trajectory after insertion of at least one flight plan section 32 that has been acquired from the electronic transmitting equipment 18 external to the flight management system 14, each additional constraint being included in a respective acquired section 32.

Each additional constraint is of a type distinct from that of constraint(s) associated with each current section 37 of the current flight plan 36, and each additional constraint is then an additional constraint relative to any constraints already associated with the current flight plan 36, while being of a type distinct from that of any such constraints already associated with the current flight plan 36.

Each additional constraint, also called an additional property, then forms a characterization property, or even a customization property, making it possible to further define the section other than with the existing constraints or properties, and in particular those provided for in the ARINC 424 standard.

These additional constraints make it possible, in particular, to further constrain or parameterize the flight management system 14 on the acquired sections 32, in order to provide additional assistance to the crew of the aircraft 10, in particular to limit the risks of accidents.

These additional constraints also allow for additional missions with constraints or properties not provided for in ARINC 424 to be carried out.

It is thus conceived that the electronic flight management system 14 and the flight management method according to the invention facilitate the use of the aircraft 10 in operation, and typically during particular missions, such as a search and rescue mission, a surveillance mission, a drop mission, or an oil platform approach mission.

The invention claimed is:

1. An electronic flight management system for an aircraft, the system being intended to be carried on board the aircraft, and comprising:

an acquisition module configured to acquire at least one flight plan section, from an electronic transmitting equipment, external to the flight management system;

an insertion module configured to insert each acquired section into a current flight plan, the current flight plan including one or more current sections, and to obtain a new flight plan resulting from the insertion of the acquired section(s);

a calculation module configured to calculate a new trajectory of the aircraft from the new flight plan; and a sending module configured to send the new trajectory to an avionics system to update flight parameters associated with a flight of the aircraft;

at least one acquired section including at least one additional constraint, each additional constraint being of a type distinct from that of the constraint(s) associated with each current section, wherein:

the calculation module being configured to calculate the new trajectory depending further on each additional constraint, and wherein each type of additional constraint is not included in ARINC 424 standard; and wherein the avionics system comprises a display configured to displaying the new trajectory and an autopilot configured to implement the new trajectory.

2. The system according to claim 1, wherein each acquired section includes one or more section legs, and each additional constraint is a constraint associated with the section or alternatively a constraint associated with a respective section leg.

3. The system according to claim 2, wherein each constraint associated with the section is of a type selected from the group consisting of:

a predefined duration constraint of the respective section with an undefined trajectory of the aircraft during said section;

a performance model constraint of the aircraft during the respective section;

an alternative section constraint of said respective section; and a predefined corridor constraint for the trajectory of the aircraft during the respective section.

4. The system according to claim 3, wherein:

if the additional constraint is of the predefined duration constraint type with undefined trajectory, then the calculation module is configured to estimate a subsequent value of at least one avionics quantity as a function of said predefined duration;

if the additional constraint is of the performance model constraint type, then the calculation module is configured to estimate a subsequent value of at least one avionics quantity as a function of the performance model defined in said constraint;

if the additional constraint is of the alternative section constraint type, then the calculation module is configured to select the alternative section defined in said constraint in case of activation of an alternative procedure by a user;

if the additional constraint is of the predefined corridor constraint type, then the calculation module is configured to calculate the new trajectory within the corridor defined in said constraint.

5. The system according to claim 2, wherein each constraint associated with a respective section leg is of a type selected from the group consisting of:

a sequencing mode constraint applied to the respective leg;

an activating of the calculation of an input transition constraint on the respective leg;

a maximum roll constraint applied for the calculation of an input transition on the respective leg;

a maximum load factor constraint applied for the calculation of an input transition on the respective leg;

a minimum amount of fuel remaining constraint at an intermediate point before an end point of the flight plan, a predicted wind constraint during the respective leg; and a vertical guidance constraint in height servo mode.

6. The system according to claim 5, wherein:

if the additional constraint is of the sequencing mode constraint type, then the calculation module is configured to apply to said leg the sequencing mode defined in said constraint;

if the additional constraint is of the activating the calculation of an input transition type with the true value constraint, then the calculation module is configured to calculate the input transition on said leg;

if the additional constraints are of the activation of the calculation of an input transition type with the true value constraint, and of the maximum roll constraint type, then the calculation module is configured to calculate the input transition on said leg with the maximum roll equal to the value defined in the respective constraint;

if the additional constraints are of the activation of the calculation of an input transition type with the true value constraint, and of the maximum load factor constraint type, then the calculation module is configured to calculate the input transition on said leg with the maximum load factor equal to the value defined in the respective constraint;

if the additional constraint is of the minimum remaining fuel quantity constraint type, then the calculation module is configured to estimate the quantity of fuel remaining at said intermediate point and generate an alert if said estimated quantity is less than the minimum remaining fuel quantity defined in said constraint;

if the additional constraint is of the predicted wind constraint type, then the calculation module is configured to estimate a subsequent value of at least one avionics quantity as a function of the predicted wind defined in said constraint;

if the additional constraint is of the vertical guidance in height servo mode constraint type, then the calculation module is configured to perform vertical guidance of the aircraft in servo mode on a height relative to the ground.

7. The system according to claim 1, wherein at least one acquired section includes additional information from among FAS-DB information and secure undecipherable information by the flight management system, and the system further comprises a transmission module configured to transmit the additional information to an electronic receiving equipment, external to the flight management system.

8. The system according to claim 7, wherein the transmission module is configured to transmit the FAS-DB information to a satellite positioning system having an SBAS function.

9. The system according to claim 1, wherein each acquired section includes a respective identifier, the identifier being distinct from one section to another.

10. A method for managing the flight of an aircraft, the method being implemented by an electronic flight management system to be carried on board the aircraft, and comprising:

acquiring at least one flight plan section, from an electronic transmitting equipment, external to the flight management system;

inserting each acquired section into a current flight plan, the current flight plan including one or more current sections, and to obtain a new flight plan resulting from the insertion of the acquired section(s);

calculating a new trajectory of the aircraft from the new flight plan; and sending the new trajectory to an avionics system to update flight parameters associated with a flight of the aircraft;

at least one acquired section including at least one additional constraint, each additional constraint being of a type distinct from that of the constraint(s) associated with each current section, wherein:

the new trajectory being calculated depending further on each additional constraint, and wherein each type of additional constraint is not included in ARINC 424 standard.

11. A non-transitory computer-readable medium including a computer program including software instructions that, when executed by a computer, implement a method according to claim 10.

12. The system according to claim 1, further comprising a display module configured to display the new trajectory of the aircraft.

13. The method according to claim 10, further comprising displaying the new trajectory of the aircraft.

* * * * *